Nov. 17, 1964  H. F. EICHACKER  3,157,752
ACTUATOR FOR AN ELECTRIC CURRENT CONSUMPTION RECORDER
Filed April 13, 1960

INVENTOR.
HAROLD F. EICHACKER
BY
Joseph K. Schofield
ATTORNEY

United States Patent Office 3,157,752
Patented Nov. 17, 1964

3,157,752
ACTUATOR FOR AN ELECTRIC CURRENT
CONSUMPTION RECORDER
Harold F. Eichacker, Wethersfield, Conn., assignor, by mesne assignments, to Ripley Company, Incorporated, Middletown, Conn., a corporation of New York
Filed Apr. 13, 1960, Ser. No. 21,946
5 Claims. (Cl. 200—19)

This invention relates particularly to meters for determining consumption of electrical current, gas, water, or other service, the meter having means to record readings thereof as by punching a tape according to a series of coded holes or by other recordable means.

An object of primary importance of the invention is to provide means to disassociate the recording device from the indicating mechanism of the meter which may be of standard form to eliminate any drag on the operating mechanism of the meter except momentarily when the reading is actually being recorded.

A feature that enables the above object to be accomplished is that contacts for the circuits to the recorder mechanism are separated from the rotating indicating devices of the meter except when the actual reading of the meter is being made so that all drag on the indicating mechanism by wiping engagement with contacts provided on a standard type current indicating meter may be completely eliminated.

Another feature of importance of the invention is to provide means to actuate the recording circuit contacts into operative position to contact the meter indicator members and to energize the circuits for a tape punching device or other recording device, this movement of the contacts being effected by means of an electro magnet which serves to move a supporting arm, the arm also forming the armature of the electro magnet and which also carries the recording contacts to a position to engage the contacts thereon with the rotating members on the meter indicating shafts.

This application is a continuation-in-part of my copending application Serial Number 760,613, filed September 12, 1958, for a meter reading and recording device now Patent Number 3,006,712 granted October 31, 1961.

With the above and other objects in view, the invention may include the features of construction and operation set forth in the following specification and illustrated in the accompanying drawing.

In the accompanying drawing, there has been shown but one embodiment of the invention now deemed to be preferable for application particularly to a household electrical current meter such as that shown in the above referred to patent, but it will be understood that the invention can be otherwise embodied and that the drawing is not to be construed as defining or limiting the scope of the invention, the claims appended to this specification being relied upon for that purpose.

Figure 1:
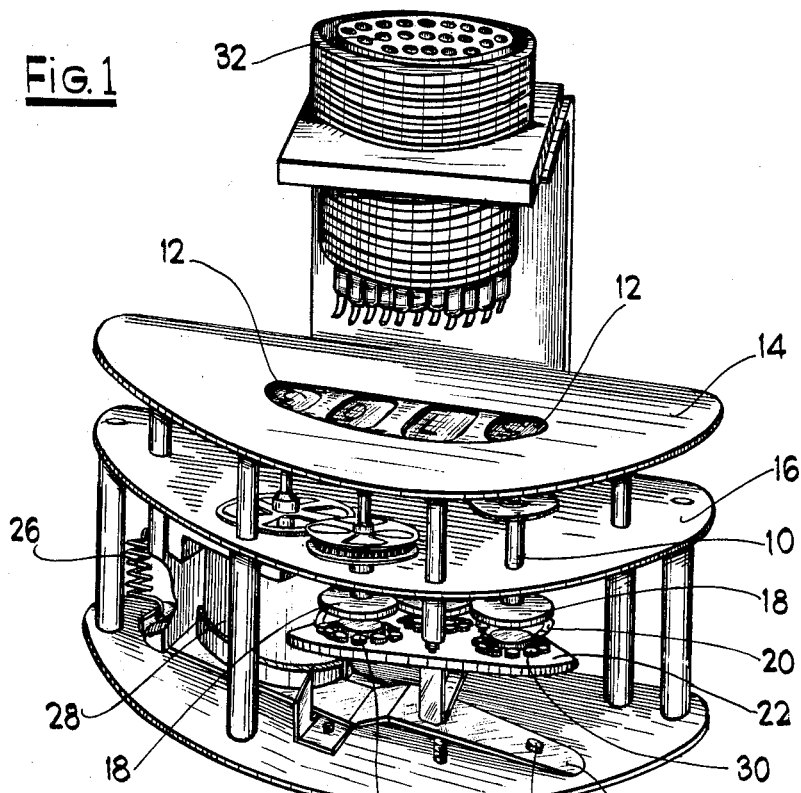
FIG. 1 is a front elevation shown in perspective of an indicating mechanism for a meter having the present invention embodied therein.

In the above mentioned drawing, there has been shown but one specific embodiment of the invention which is now deemed preferable, but it will be understood that changes and modifications may be made within the scope of the appended claims without departing from the spirit of the invention.

The present invention comprises an additional movable member supplementing the mechanism shown and described in the above referred to patent. It will be understood that the same form of tape punching device or other means employed for recording the meter indications may be used as in the referred to patent and that the circuits shown in that patent may be made use of in the present improved form of indicator and recorder for various forms of meters.

Essentially the improvement comprises mounting the contacts for the circuits to actuate the recorder on a pivotally mounted arm normally maintained in a position in which the contacts are out of engagement with all movable parts of the indicating mechanism of the meter. On connecting the tape punching device, or other form of recording device to the circuits for the meter, the arm carrying the recorder contacts is forced upward by an electro-magnet to bring the contacts into contact with the rotating indicating pointers mounted on the lower ends of the indicator shafts and rotating therewith. The operation of the recorder is or may be in all respects similar to that of the recorder described and shown in the above referred to patent.

Referring more in detail to the figures of the drawing there is shown the indicating mechanism of a standard indicating meter for electric current.

This meter and its indicating mechanism may be similar to the mechanism shown and described in my above referred to copending application now Patent Number 3,006,712, or may be added to any standard current indicating meter. The flow of electric current rotates a series of shafts 10 which at their upper ends carry conventional digit disks 12. The construction of the indicating device forms no part of the present invention and may be of a standard indicating meter the reading of which is made visually by observation of the particular angular positions of the digit disks 12 appearing within an opening formed in the plate 14 above and partially covering the digit wheels.

The shafts 10 as shown are rotatably mounted between plates 14 and 16 and may be driven in the usual manner by the metering mechanism through conventional gearing not shown. At the lower ends of the shafts 10 carrying the digit carrying disks 12 are additional disks 18, each disk 18 having a resilient wiping member 20 of metal depending therefrom preferably in the form of a loop, from the lower surface of the disk. Rotation of these disks 18 and their wiping members 20 therefore correspond with the rotation of the digit disks 12.

Positioned below the lower ends of the indicating mechanism shafts 10 carrying the disks 18 and wiping member 20 is a plate 22 supported on a lever or arm 24 pivotally mounted and normally maintained in its lower position by a spring 26. To force the lever 24 to its upper position an electro-magnet 28 is provided adjacent the lever 24 so that when this magnet is energized the lever 24 which constitutes the armature of the magnet 28 is oscillated against the pressure of spring 26. In its upper or operative position recorder circuit contacts 30 on the upper surface of the plate 22 are contacted by the wiper members 20 on the disks 18 carried by the meter indicating shafts 10.

Figure 2:
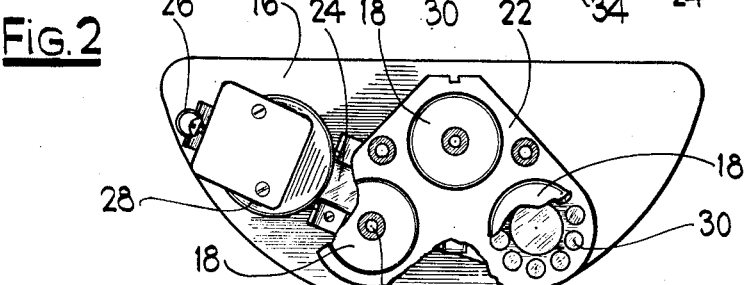
FIG. 2 is a plan view of a part of the meter indicating and recording means shown in FIG. 1, the plan being taken on the plane of line 2—2 in FIG. 3 and a part being broken away to more clearly show the contacts for the recorder mechanism circuits.
Figure 3:
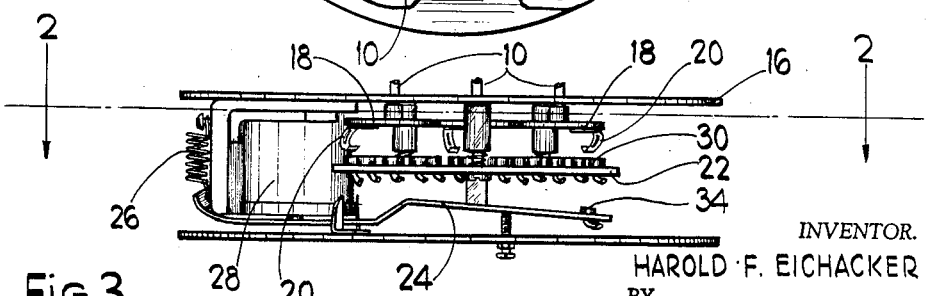
FIG. 3 is a front elevation of portions of the meter showing the contact carrying member of the recording device in its inoperative position.

As shown in FIG. 2 of the drawing, the contacts 30 for each wiper member are in circular series, there being one series for each indicator shaft 10 and there are ten contacts in each series. When a contact 30 is wiped by the member 20 depending from a digit shaft 10, a circuit through one of the contacts 30 and wiper member 20 is closed to a recorder. The circuits closed by engagement of the depending wiping members 20 with specific contacts 30 will record, preferably by punching coded holes in a tape or other conventional recording means, the same amount as that indicated by the position of the digit wheels 12 of the indicating device.

As stated above the operation of the contacts 30 and their circuits is in every way similar to that of my patent. During normal operation of the meter the plate 22 carrying the contacts 30 will be in its lower position so that no parts of the recorder mechanism are in contact with any part of the indicator mechanism. The indicator mechanism, therefore, operates as a standard indicating meter without any drag whatever being placed on any of its operative parts by the recorder mechanism.

When a reading of the meter is to be recorded the person reading the meter first connects his recorder lead cable as shown and described in my co-pending application to the socket member 32 associated with the meter. This socket member 32 has recesses electrically connected to the individual contacts 30 and the recorder mechanism has its circuits detachably connected to the socket member.

The circuits shown and described in my co-pending application may be employed to connect the present form of recorder. An additional contact 34 may be placed at the outer end of the lever 24 carrying the contact plate 22 of the recorder. This contact 34 may be used to connect line voltage to the recorder when the recording mechanism is connected to the socket member 32 to operate the tape punching or other recording device carried by the individual reading the meter. This circuit may enter the meter by way of one of the recesses in the multiple socket.

The recorder mechanism adapted for use with the present form of indicating meter is or may be similar in every way to that shown in the above referred to co-pending application. Furthermore the circuits for the recorder mechanism described and claimed in the above referred to co-pending application may be similar generally to those used in present conventional or standard forms of meter. It will be understood, however, that there well be a circuit supplementary to those shown in my co-pending application for energizing the electro magnet 28.

Similarly, the circuits for the punching device shown in my co-pending application are identical to those called for in the present application. An additional circuit if desired may be closed by contact 34 on the lever 24 to bring current from the municipal supply to actuate the tape punching device of the recorder mechanism.

I claim as my invention:

1. A meter for indicating and recording electric current consumption comprising a base, a plurality of shafts mounted therein rotation of which determines the current consumption, wiping contactors carried by said shafts, a plate carrying circular series of contacts respectively engaged by rotation of said wiping contactors, circuits for a current recorder closed by said wiping contactors engaging individual contacts of said circular series when energized, means normally maintaining said plate in its inoperative position and electro-magnetic means to actuate said plate to move said series contacts into engagement with said wiping contactors, a lever supporting said plate and a supplemental contact on said lever simultaneously moved into engagement with a fixed contact to energize said recording device circuits.

2. A meter for indicating and recording electric current consumption comprising a base, a plurality of parallel shafts mounted therein rotation of which determines the current consumption, wiping contactors carried by said shafts, a plate carrying a plurality of contacts arranged in circular series respectively concentric with said shafts, secured in fixed position on said plate for engagement respectively with said wiping contactors engaging individual contacts of said circular series, and an electromagnet to raise said plate when energized to move said series of fixed contacts into engagement with said wiping contactors.

3. A meter for indicating and recording electric current consumption comprising a base, a plurality of parallel shafts mounted therein rotation of which determines the current consumption, wiping contactors carried by said shafts and rotating therewith, a plurality of contacts arranged in circular series respectively concentric with said shafts and individually engaged by rotation of said wiping contactors, a plate on which said series of contacts are mounted, a lever to which said plate is secured, said lever forming the armature of an electromagnet, circuits for a current recorder closed by said wiping contactors engaging individual contacts of said circular series, and electromagnetic means when energized to actuate said plate and move said series of fixed contacts into engagement with said wiping contactors.

4. A meter for indicating and recording electric current consumption comprising a base, a plurality of parallel shafts mounted therein rotation of which determines the current consumption, wiping contactors carried by said shafts, a plurality of contacts arranged in circular series respectively concentric with said shafts, respectively engaged by rotation of said wiping contactors, a pivotally movable plate on which said series of contacts are mounted, circuits for a current recorder closed by each of said wiping contactors engaging individual contacts of each of said circular series, said contacts being maintained normally out of contact with said wiping contactors, and an electromagnet to pivotably move said plate when energized to actuate said series of contacts into momentary contact with said wiping contactors when a meter reading is being recorded, said plate being supported on a pivotally mounted lever forming the armature for said electromagnet.

5. A meter for indicating and recording electric current consumption comprising a base, a plurality of parallel shafts mounted therein rotation of which determines the current consumption, wiping contactors carried by said shafts, a plate carrying a plurality of contacts arranged in circular series respectively concentric with said shafts, respectively engaged by rotation of said wiping contactors, a pivotally mounted lever on which said plate is mounted, circuits for a current recorder closed by said wiping contactors engaging individual contacts of said circular series, said contacts being normally out of contact with said wiping contactors, and an electromagnet adjacent said lever acting when energized to move said lever and plate to actuate said series of contacts momentarily into contact with said wiping contactors when a meter reading is being recorded, said plate being supported on a pivotally mounted lever forming the armature for said electromagnet.

References Cited in the file of this patent

UNITED STATES PATENTS

| | | |
|---|---|---|
| 1,244,634 | Neff | Oct. 30, 1917 |
| 1,737,863 | Noonan | Dec. 3, 1929 |
| 2,085,415 | Chauveau | June 29, 1937 |
| 2,194,296 | Dickieson | Mar. 19, 1940 |
| 2,241,548 | Frischknecht | May 13, 1941 |
| 2,302,769 | Haselton et al. | Nov. 24, 1942 |
| 2,725,852 | Cramer | Dec. 6, 1955 |
| 2,870,278 | Shelton | Jan. 20, 1959 |